US010398213B2

(12) United States Patent
Vargas et al.

(10) Patent No.: US 10,398,213 B2
(45) Date of Patent: Sep. 3, 2019

(54) AUDIOVISUAL-CAPTURING SYSTEM FOR A LIGHTED MIRROR

(71) Applicants: John Vargas, West New York, NY (US); Anabel Vargas, West New York, NY (US)

(72) Inventors: John Vargas, West New York, NY (US); Anabel Vargas, West New York, NY (US)

( * ) Notice: Subject to any disclaimer, the term of this patent is extended or adjusted under 35 U.S.C. 154(b) by 483 days.

(21) Appl. No.: 15/331,740

(22) Filed: Oct. 21, 2016

(65) Prior Publication Data

US 2017/0118385 A1 Apr. 27, 2017

Related U.S. Application Data

(60) Provisional application No. 62/244,551, filed on Oct. 21, 2015.

(51) Int. Cl.

| | |
|---|---|
| ***A45D 42/10*** | (2006.01) |
| ***H04N 5/225*** | (2006.01) |
| ***G02B 7/182*** | (2006.01) |
| ***G03B 15/03*** | (2006.01) |
| ***G03B 17/56*** | (2006.01) |

(52) U.S. Cl.

CPC ........... *A45D 42/10* (2013.01); *G02B 7/1824* (2013.01); *G03B 15/03* (2013.01); *G03B 17/561* (2013.01); *H04N 5/2251* (2013.01); *G03B 2215/0539* (2013.01)

(58) Field of Classification Search

CPC ...... A45D 42/10; G02B 7/1824; G03B 15/03; G03B 17/561; G03B 2215/0539; H04N 5/2251

See application file for complete search history.

(56) References Cited

U.S. PATENT DOCUMENTS

2003/0041871 A1* 3/2003 Endo ...................... A45D 45/00 132/301
2007/0066247 A1* 3/2007 Mooney .................. H04M 1/21 455/90.3
2010/0296298 A1* 11/2010 Martin, Jr. ............. A45D 42/10 362/311.06

(Continued)

FOREIGN PATENT DOCUMENTS

WO WO 2017/162504 * 9/2017 ............. A45D 42/10

*Primary Examiner* — John R Schnurr

(57) ABSTRACT

An audiovisual-capturing system for a lighted mirror is used to illuminate a user's face and aid in capturing images or video of the user through a one-way mirror. The system includes a support structure, a one-way mirror, and a plurality of lights. The support structure includes a bordering frame which attached around the one-way mirror. The plurality of lights is connected to the bordering frame and is distributed about the bordering frame. The plurality of lights is used to illuminate the user's face. The support structure also includes a device stand which is used to support an audiovisual-capturing device. The one-way mirror is positioned in between the device stand and the plurality of lights. This allows the audiovisual-capturing device to capture images or record video through the one-way mirror, while the user is able to see their reflection through the one-way mirror.

17 Claims, 7 Drawing Sheets

(56) References Cited

U.S. PATENT DOCUMENTS

| | | | | |
|---|---|---|---|---|
| 2012/0160260 | A1* | 6/2012 | Rolston | A45D 33/32 132/288 |
| 2012/0279516 | A1* | 11/2012 | Bouix | A45D 33/008 132/301 |
| 2013/0235607 | A1* | 9/2013 | Yang | F21V 33/004 362/551 |
| 2016/0012279 | A1* | 1/2016 | Bludau | G06K 9/00255 348/77 |
| 2016/0255941 | A1* | 9/2016 | Yang | A45D 42/10 |
| 2016/0277660 | A1* | 9/2016 | Kaiser | G03B 17/38 |
| 2016/0331101 | A1* | 11/2016 | Lewis | A45D 33/26 |
| 2017/0200009 | A1* | 7/2017 | Bertolet | G06F 21/575 |
| 2018/0032227 | A1* | 2/2018 | Broxson | G06F 3/0488 |

* cited by examiner

AUDIOVISUAL-CAPTURING SYSTEM FOR A LIGHTED MIRROR

The current application claims a priority to the U.S. Provisional Patent application Ser. No. 62/244,551 filed on Oct. 21, 2015.

FIELD OF THE INVENTION

The present invention relates generally to adjustable mirrors. More specifically, the present invention relates to a mirror which not only illuminates a user's face and reflects the user's image, but may also be used to capture images or videos.

BACKGROUND OF THE INVENTION

Mirrors are commonly used to reflect a user's image such that the user may easily apply makeup or maintain personal hygiene. Many vanity mirrors also illuminate a user's face, enabling the user to see the details of their face more clearly. Of the mirrors that include lights, most only emit white light. While this is generally acceptable, many users may require different colors of light. For actors who may perform under a range of lighting conditions, this may be especially important. Most mirrors also do not aid users in taking pictures or recording videos. Often, users who may wish to photograph themselves or record a video must record their reflection through the mirror or use a separate stand to support a camera. Capturing a picture or video through a reflection can be unfavorable because doing so may cause the camera itself to be in the picture or video. Alternatively, using a stand may add unwanted clutter for the user.

Accordingly, there is a present need for an audiovisual-capturing system for a lighted mirror which can illuminate a user's face in various colors or intensities and also provide a means of capturing images or videos. The present invention makes use of a one-way mirror that reflects the user's image on one side but is transparent on the other side. This enables a smartphone, a camera, or some form of audiovisual-capturing device to take pictures or videos of the user through the one-way mirror. The system also includes a plurality of lights which may be adjusted in color or intensity as needed by the user. A remote control may be used to wirelessly adjust the plurality of lights or control the audiovisual-capturing device.

DETAILED DESCRIPTION OF THE INVENTION

All illustrations of the drawings are for the purpose of describing selected versions of the present invention and are not intended to limit the scope of the present invention.

Figure 1:
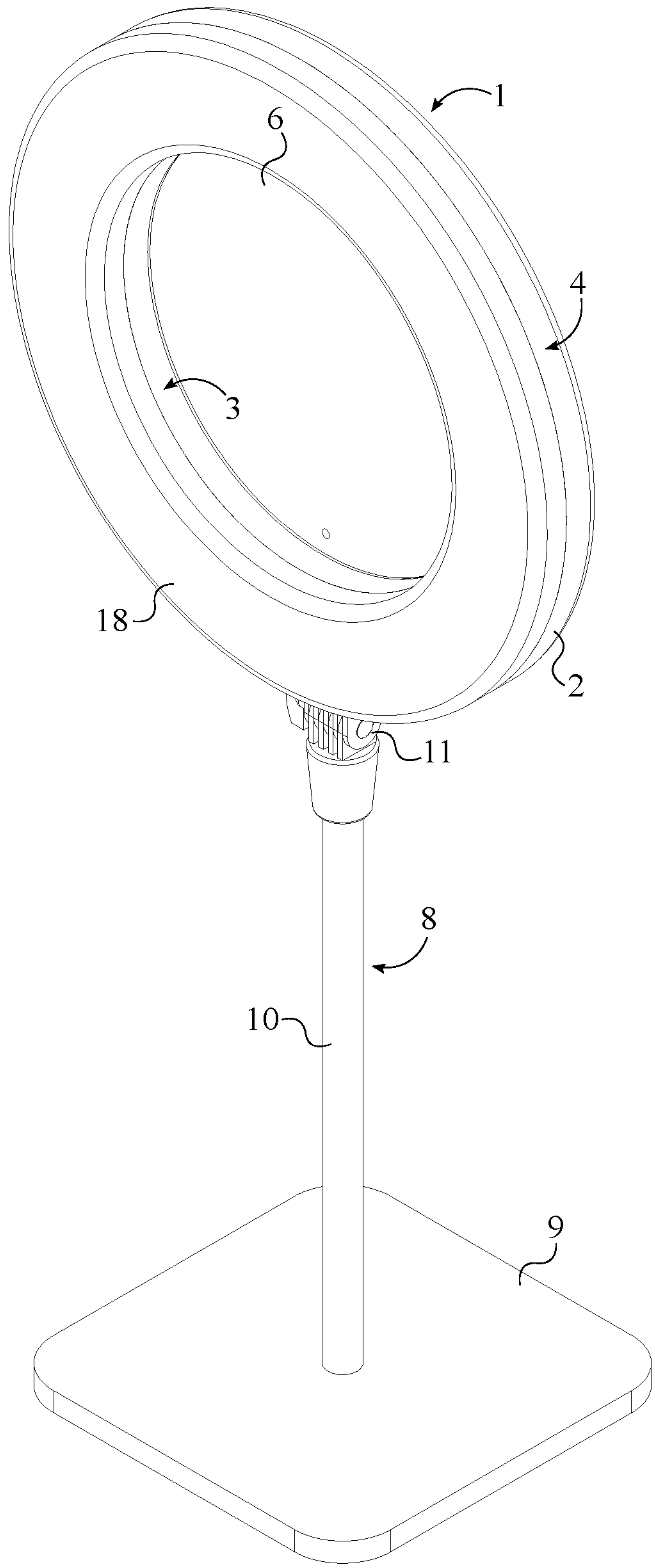
FIG. 1 is a front perspective view of the present invention.
Figure 2:
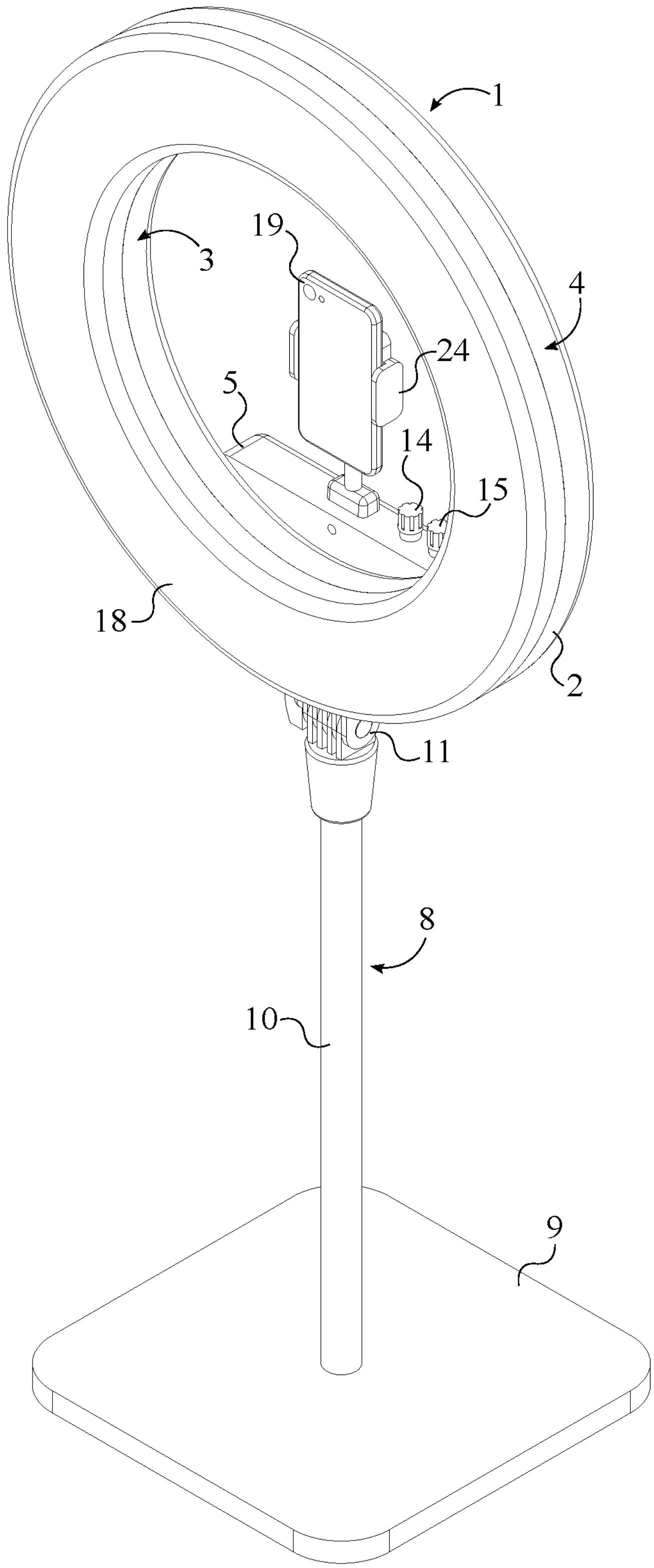
FIG. 2 is a front perspective view of the present invention with the one-way mirror not shown.
Figure 3:
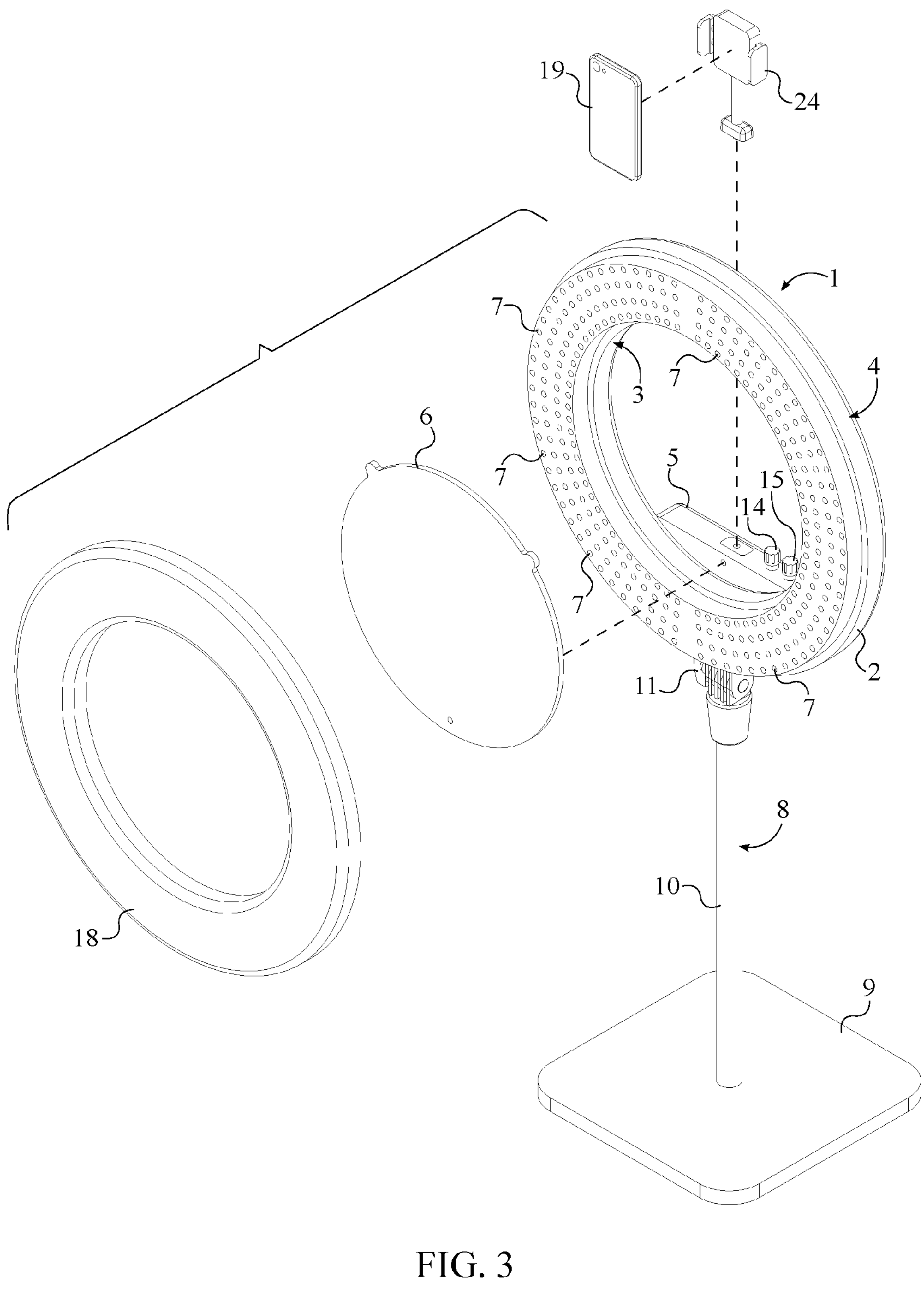
FIG. 3 is an exploded front perspective view of the present invention.

With reference to FIGS. 1-3, the present invention is an audiovisual-capturing system for a lighted mirror used to aid users in applying makeup or maintaining personal hygiene. The present invention comprises a support structure 1, a one-way mirror 6, a plurality of lights 7, and a power supply system 20. The support structure 1 is used to hold the one-way mirror 6 and the plurality of lights 7. The support structure 1 comprises a bordering frame 2 and a device stand 5. The bordering frame 2 is used to support the one-way mirror 6 and positions the plurality of lights 7 about the one-way mirror 6. The bordering frame 2 is perimetrically attached around the one-way mirror 6. The plurality of lights 7 is connected adjacent to the bordering frame 2 and is distributed about the bordering frame 2. This arrangement positions the plurality of lights 7 about the one-way mirror 6 in order to illuminate the user's face, while also allowing the user to see their reflection in the one-way mirror 6. In the preferred embodiment of the present invention, the each of the plurality of lights 7 is a light emitting diode (LED) light; however, various other types of lights may be used in alternative embodiments. In the preferred embodiment of the present invention, the bordering frame 2 and the one-way mirror 6 are circular in shape. In alternative embodiments of the present invention, the bordering frame 2 and the one-way mirror 6 may be square, rectangular, oval, or any other shape. The power supply system 20 is used to provide electricity to the plurality of lights 7 and may also be used to power additional devices. Accordingly, the plurality of lights 7 is electrically connected to the power supply system 20. The bordering frame 2 comprises an interior surface 3 and an exterior surface 4. The device stand 5 is mounted onto the bordering frame 2, adjacent to the interior surface 3. The device stand 5 is used to mount a camera, smartphone, or any similar audiovisual-capturing device to the support structure 1. The one-way mirror 6 is positioned in between the device stand 5 and the plurality of lights 7. This arrangement positions the audiovisual-capturing device such that images or video of the user can be captured through the one-way mirror 6, while the user only sees their reflection.

In reference to FIG. 1, the present invention further comprises a frame stand 8. The frame stand 8 is used to hold the support structure 1 and position the support structure 1 as needed by the user. The frame stand 8 is attached onto the bordering frame 2, adjacent to the exterior surface 4. The frame stand 8 and the device stand 5 are radially aligned to each other about the bordering frame 2. This arrangement allows a camera or smartphone to be centrally mounted relative to the frame stand 8 such that the support structure 1 is balanced on the frame stand 8.

Figure 7:
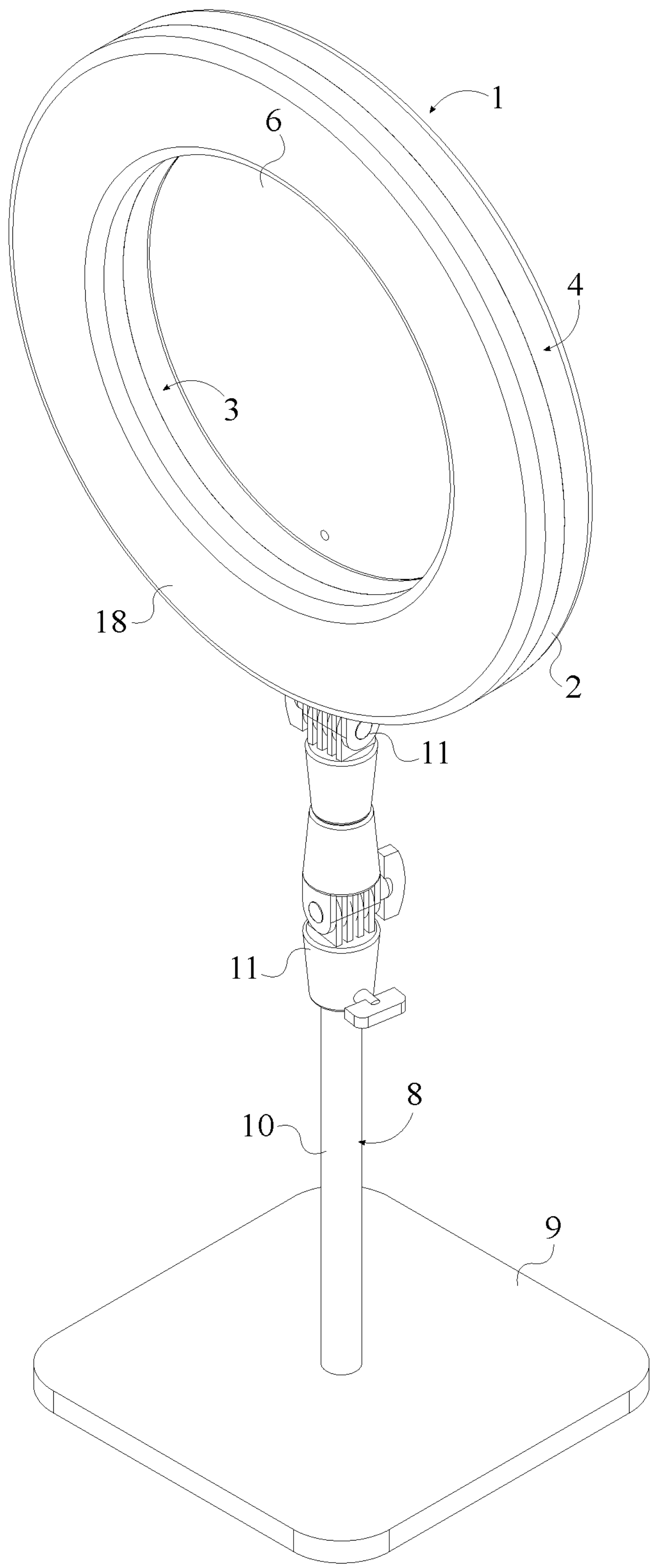
FIG. 7 is a front perspective view of an alternative embodiment of the present invention, wherein the alternative embodiment includes two frame adjusters.

In reference to FIG. 1 and FIG. 7, the frame stand 8 comprises a base 9, an offsetting arm 10, and at least one frame adjuster 11. The base 9 is terminally fixed to the offsetting arm 10. The base 9 is used to anchor the support structure 1. In the preferred embodiment of the present invention, the base 9 resembles a platform which allows the present invention to stand on a table, a desk, or some other flat surface. In an alternative embodiment of the present invention, the base 9 may be a clamp, used to attach the present invention to objects or furniture. The offsetting arm 10 is used to create space between the support structure 1 and the base 9. In the preferred embodiment of the present invention, the offsetting arm 10 is flexible, allowing the positioning of the support structure 1 to be easily adjusted. The frame adjuster 11 is terminally attached to the offsetting arm 10, opposite to the base 9. The frame adjuster 11 is used to alter the positioning of the support structure 1 such that the one-way mirror 6 can be oriented into a desired position. Multiple frame adjusters 11 may be used together to tilt or orient the support structure 1 in more than one direction. The frame adjuster 11 is attached adjacent to the exterior surface 4. This arrangement allows the support structure 1 to be easily adjusted into a position that meets the needs of the user. The frame adjuster 11 is also designed to be removed from the offsetting arm 10 and can be attached to various objects such as a photography stand or tripod.

Figure 4:
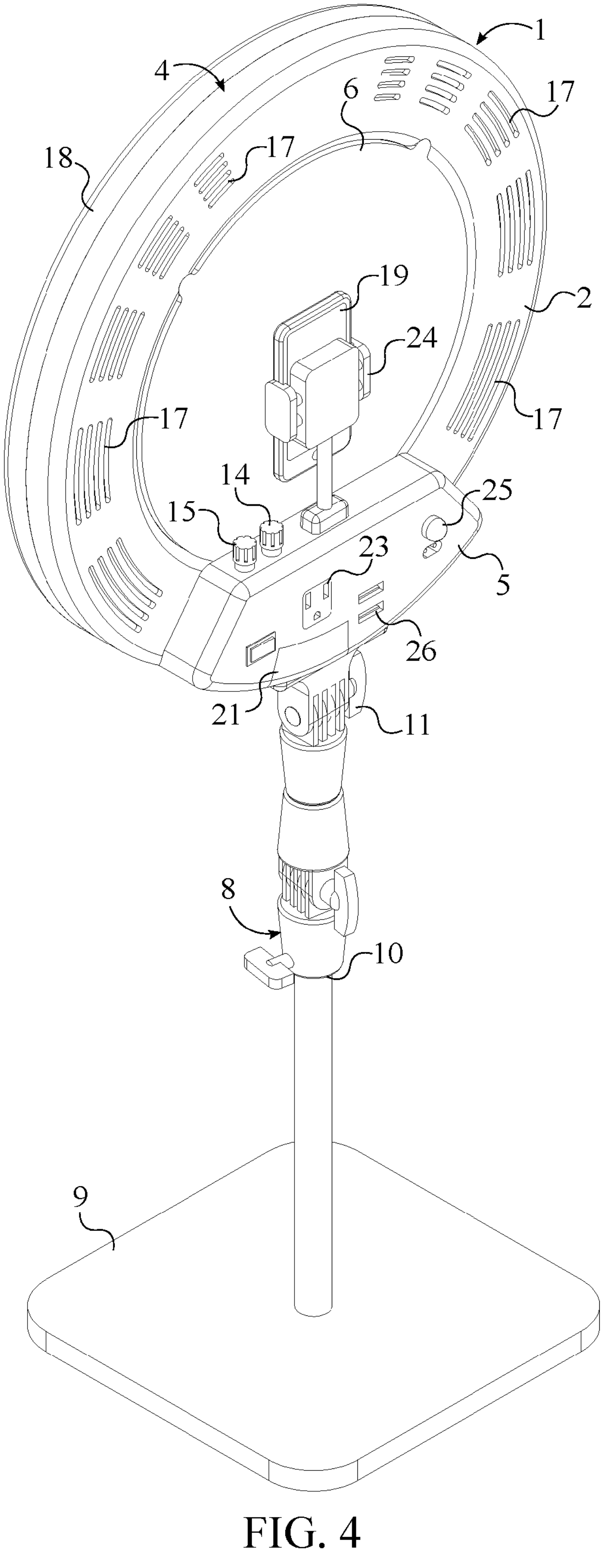
FIG. 4 is a back perspective view of the present invention.
Figure 6:
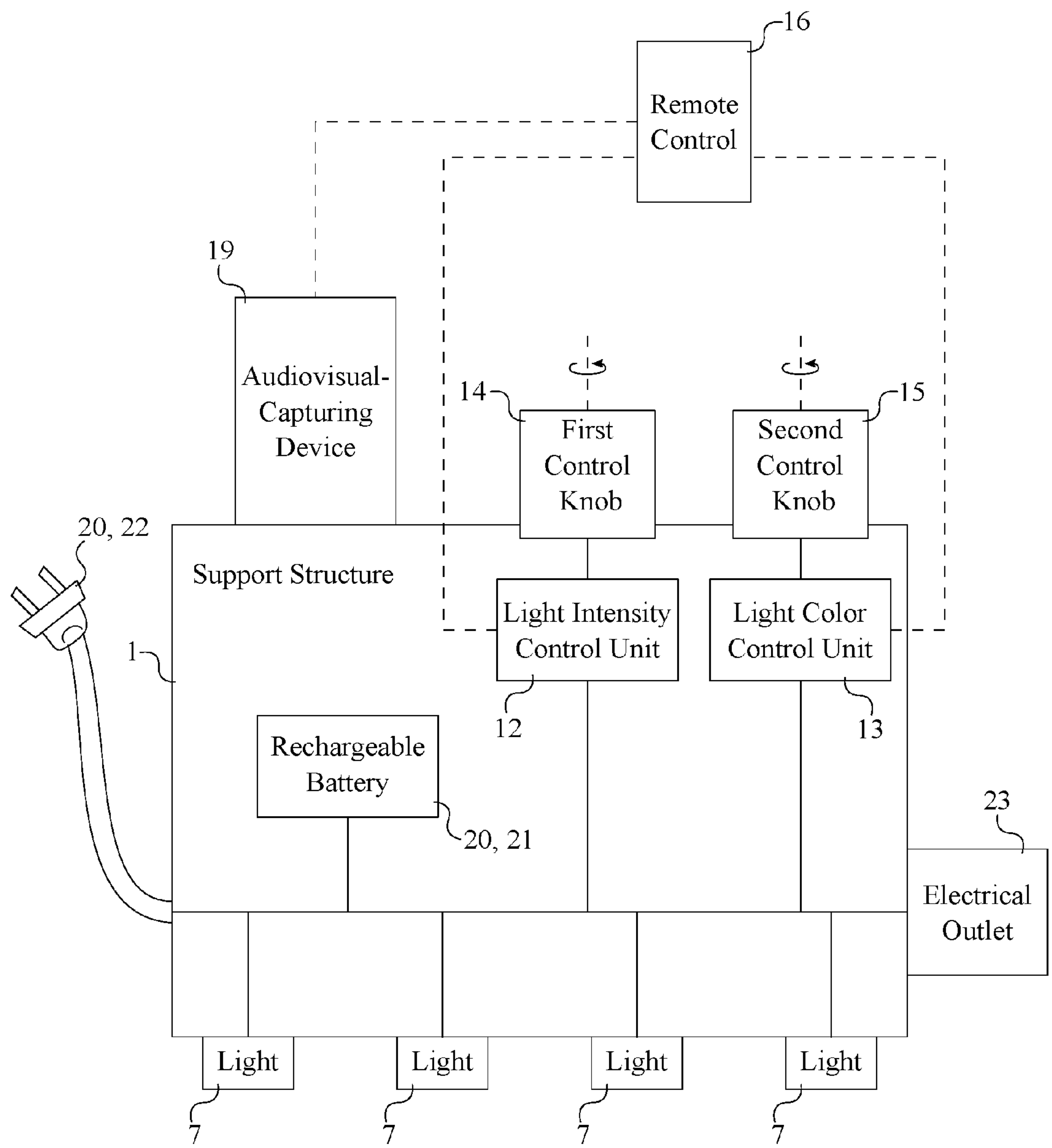
FIG. 6 is a schematic view of the present invention, wherein electrical connections of the present invention are shown with solid lines and wireless connections of the present invention are shown in dashed lines.

In reference to FIG. 4 and FIG. 6, the present invention further comprises a light intensity control unit 12 which is used to alter the brightness or the intensity of the plurality of lights 7. The light intensity control unit 12 is mounted into the support structure 1 and is electrically connected to the plurality of lights 7. In the preferred embodiment of the present invention, the present invention further comprises a first control knob 14 which is used to adjust an illumination intensity for each of the plurality of lights 7. The first control knob 14 is rotatably mounted to the support structure 1 and is operatively coupled to the light intensity control unit 12. This arrangement allows users to manually interact with the light intensity control unit 12 in order to adjust the illumination intensity for the plurality of lights 7.

In reference to FIG. 4 and FIG. 6, the present invention further comprises a light color control unit 13 which is used to alter the color of the plurality of lights 7. The light color control unit 13 allows the user to adjust the plurality of lights 7 to create warmer or cooler tones in order to produce a desired lighting. Further, the light color control unit 13 may be used to produce ultraviolet (UV) light or generate light flashes with the plurality of lights 7. The light color control unit 13 is mounted into the support structure 1 and is electrically connected to the plurality of lights 7. The present invention further comprises a second control knob 15 which is used to change a light color for each of the plurality of lights 7. The second control knob 15 is rotatably mounted to the support structure 1 and is operatively coupled to the light color control unit 13. This arrangement allows users to manually interact with the light color control unit 13 in order to adjust the light color for the plurality of lights 7.

In reference to FIG. 4, the present invention further comprises a plurality of cooling vents 17. The plurality of cooling vents 17 is used to help remove heat from within the support structure 1. The plurality of cooling vents 17 traverse into the bordering frame 2, opposite to the plurality of lights 7. The plurality of cooling vents 17 is distributed about the bordering frame 2. This is done to ensure that heat is removed from the support structure 1 evenly, preventing specific areas or components from overheating.

In reference to FIG. 1 and FIG. 3, the present invention further comprises a light diffuser 18. The light diffuser 18 is used to scatter the light emitted from the plurality of lights 7. This is done to provide a more even lighting. In the preferred embodiment of the present invention, the light diffuser 18 is made from acrylic; however, other materials may alternatively be used. The light diffuser 18 is mounted onto the bordering frame 2, but may be removed if required by the user. The plurality of lights 7 is positioned in between the light diffuser 18 and the bordering frame 2 such that all of the light emitted by the plurality of lights 7 must pass through the light diffuser 18 before reaching the user.

Figure 5:
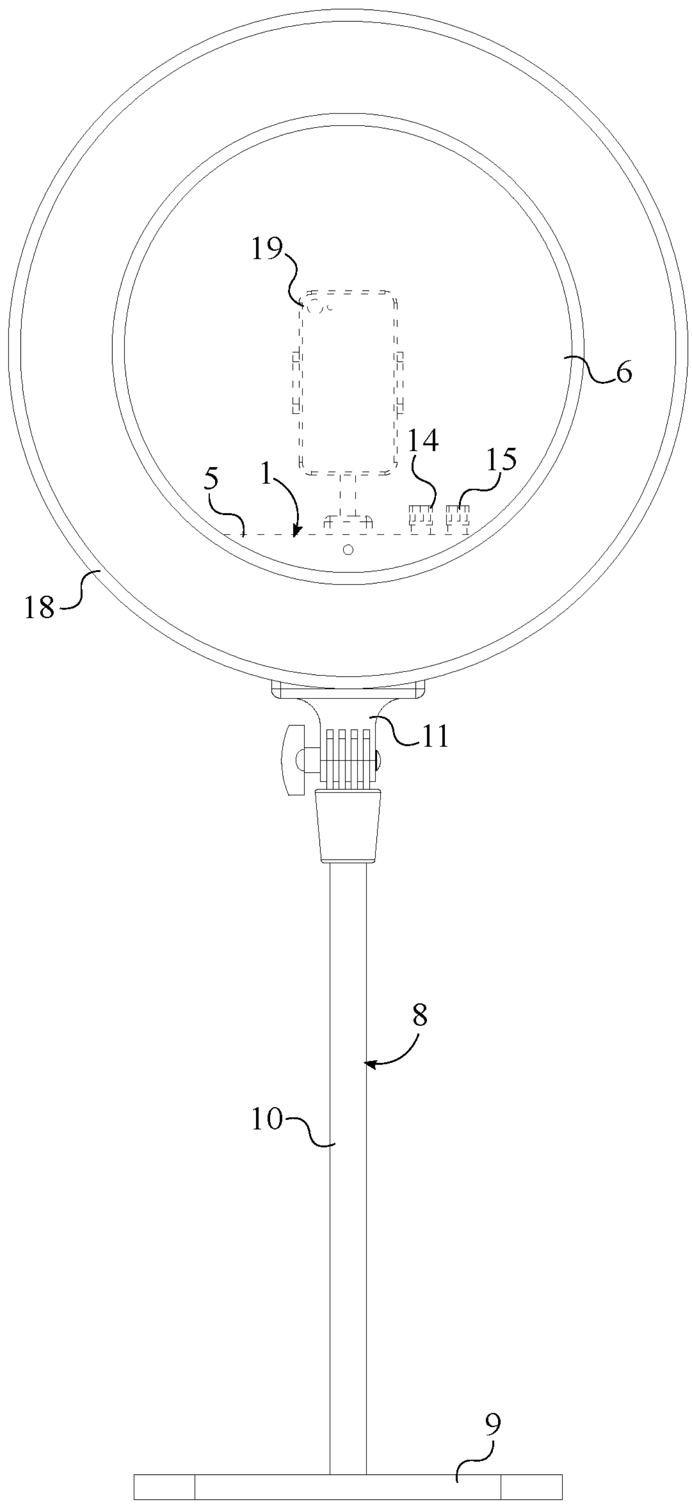
FIG. 5 is a front view of the present invention, wherein the audiovisual-capturing device, the device stand, the first control knob, and the second control knob are located behind the one-way mirror and shown in dashed lines.

In reference to FIGS. 4-5, the present invention further comprises an audiovisual-capturing device 19. As previously mentioned, the audiovisual-capturing device 19 may be a camera, smartphone, or any similar device used to capture pictures or video. The audiovisual-capturing device 19 is mounted onto the device stand 5. This arrangement makes it easy for a user to view their reflection, while also taking pictures or video. This can be especially useful while applying makeup or creating a makeup tutorial.

In reference to FIGS. 3-4, the present invention further comprises a device adapter 24. The device adapter 24 is used to accommodate one or more types of audiovisual-capturing devices 19. The device adapter 24 is mounted in between the audiovisual-capturing device 19 and the device stand 5. The device adapter 24 is designed to be adjustable in order to ensure that the audiovisual-capturing device 19 is centered in relation to the one-way mirror 6.

In reference to FIG. 6, the present invention further comprises at least one remote control 16. The remote control 16 is used to wirelessly interact with the plurality of lights 7 and the audiovisual-capturing device 19. The remote control 16 is communicably coupled to the light intensity control unit 12. This allows the user to wirelessly adjust the light intensity for the plurality of lights 7. The remote control 16 is also communicably coupled to the light color control unit 13. This allows the user to wirelessly adjust the light color for the plurality of lights 7. Furthermore, the remote is communicably coupled to the audiovisual-capturing device 19, allowing users to take pictures or video wirelessly.

The present invention further comprises at least one fuse 25. The fuse 25 is electrically connected in between the power supply system 20 and the plurality of lights 7. The fuse 25 may also be connected in between the power supply system 20 and the light intensity control unit 12, and in between the power supply system 20 and the light color control unit 13. The fuse 25 is designed to fail in the event of a power surge or some other malfunction in order to prevent the rest of the present invention from being damaged.

In reference to FIG. 6, the power supply system 20 comprises a rechargeable battery 21. The rechargeable battery 21 is mounted within the support structure 1 and is used to power the plurality of lights 7. In the preferred embodiment of the present invention, the power supply system 20 further comprises a removable power cord 22. The removable power cord 22 is externally tethered to the support structure 1 and may be used to charge the rechargeable battery 21 or to provide power for the plurality of lights 7.

In reference to FIG. 4 and FIG. 6, the present invention further comprises an electrical outlet 23. The electrical outlet 23 is externally mounted into the support structure 1 and is electrically connected to the power supply system 20. The electrical outlet enables the user to plug devices into the present invention in order to power said devices. In addition to the electrical outlet 23, the present invention comprises at least one Universal Serial Bus (USB) port 26 which is externally mounted into the supports structure and can be used to power the audiovisual-capturing device 19.

Although the invention has been explained in relation to its preferred embodiment, it is to be understood that many other possible modifications and variations can be made without departing from the spirit and scope of the invention as hereinafter claimed.

What is claimed is:

1. An audiovisual-capturing system for a lighted mirror comprises:

a support structure;

a one-way mirror;

a plurality of lights;

a power supply system;

the support structure comprises a bordering frame and a device stand;

the bordering frame comprises an interior surface and an exterior surface;

the bordering frame being perimetrically attached around the one-way mirror;

the plurality of lights being connected adjacent to the bordering frame;

the plurality of lights being distributed about the bordering frame;

the plurality of lights being electrically connected to the power supply system;

the device stand being mounted onto the bordering frame, adjacent to the interior surface; and the one-way mirror being positioned in between the device stand and the plurality of lights.

2. The audiovisual-capturing system for a lighted mirror as claimed in claim 1 comprises:

a frame stand;

the frame stand being attached onto the bordering frame, adjacent to the exterior surface; and the frame stand and the device stand being radially aligned to each other about the bordering frame.

3. The audiovisual-capturing system for a lighted mirror as claimed in claim 2 comprises:

the frame stand comprises a base, an offsetting arm, and at least one frame adjuster;

the base being terminally fixed to the offsetting arm;

the frame adjuster being terminally attached to the offsetting arm, opposite to the base; and the frame adjuster being attached adjacent to the exterior surface.

4. The audiovisual-capturing system for a lighted mirror as claimed in claim 1 comprises:

a light intensity control unit;

the light intensity control unit being mounted into the support structure; and the light intensity control unit being electrically connected to the plurality of lights.

5. The audiovisual-capturing system for a lighted mirror as claimed in claim 4 comprises:

a first control knob;

the first control knob being rotatably mounted to the support structure; and the first control knob being operatively coupled to the light intensity control unit, wherein the first control knob is used to adjust an illumination intensity for each of the plurality of lights.

6. The audiovisual-capturing system for a lighted mirror as claimed in claim 5 comprises:

at least one remote control; and the remote control being communicably coupled to the light intensity control unit.

7. The audiovisual-capturing system for a lighted mirror as claimed in claim 1 comprises:

a light color control unit; and the light color control unit being mounted into the support structure;

the light color control unit being electrically connected to the plurality of lights.

8. The audiovisual-capturing system for a lighted mirror as claimed in claim 7 comprises:

a second control knob;

the second control knob being rotatably mounted to the support structure; and the second control knob being operatively coupled to the light color control unit, wherein the second control knob is used to change a light color for each of the plurality of lights.

9. The audiovisual-capturing system for a lighted mirror as claimed in claim 7 comprises:

at least one remote control; and the remote control being communicably coupled to the light color control unit.

10. The audiovisual-capturing system for a lighted mirror as claimed in claim 1 comprises:

a plurality of cooling vents;

the plurality of cooling vents traversing into the bordering frame, opposite to the plurality of lights; and the plurality of cooling vents being distributed about the bordering frame.

11. The audiovisual-capturing system for a lighted mirror as claimed in claim 1 comprises:

a light diffuser;

the light diffuser being mounted onto the bordering frame; and the plurality of lights being positioned in between the light diffuser and the bordering frame.

12. The audiovisual-capturing system for a lighted mirror as claimed in claim 1 comprises:

an audiovisual-capturing device; and the audiovisual-capturing device being mounted onto the device stand.

13. The audiovisual-capturing system for a lighted mirror as claimed in claim 12 comprises:

a device adapter; and the device adapter being mounted in between the audiovisual-capturing device and the device stand.

14. The audiovisual-capturing system for a lighted mirror as claimed in claim 12 comprises:

at least one remote control; and the remote control being communicably coupled to the audiovisual-capturing device.

15. The audiovisual-capturing system for a lighted mirror as claimed in claim 1 comprises:

the power supply system comprises a rechargeable battery; and the rechargeable battery being mounted within the support structure.

16. The audiovisual-capturing system for a lighted mirror as claimed in claim 1 comprises:

the power supply system comprises a removable power cord; and the removable power cord being externally tethered to the support structure.

17. The audiovisual-capturing system for a lighted mirror as claimed in claim 1 comprises:

an electrical outlet;

the electrical outlet being externally mounted into the support structure; and the electrical outlet being electrically connected to the power supply system.

* * * * *